March 31, 1925.          1,531,926
P. HALLOT
AUTOMATIC GOVERNOR FOR THE BRAKES OF MOTOR AND
RAILWAY WHEELS AND OTHER ROTARY DEVICES
Filed April 6, 1921
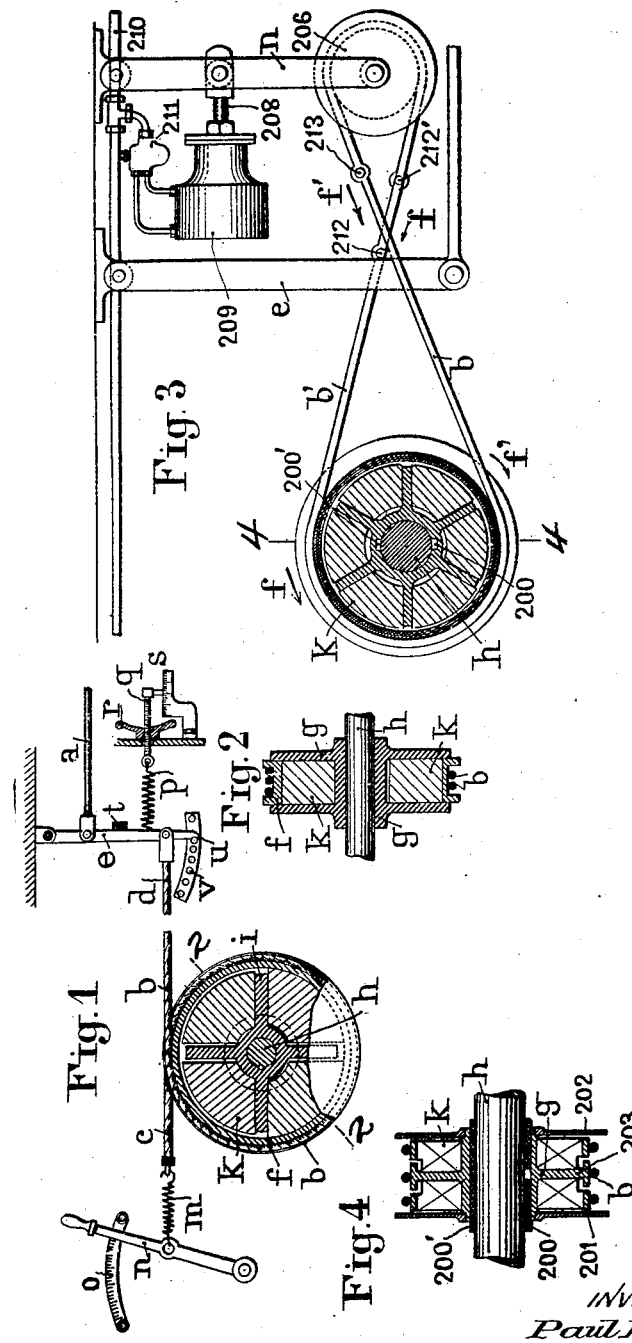
INVENTOR
Paul Hallot
BY
ATTORNEYS Patented Mar. 31, 1925.

1,531,926

UNITED STATES PATENT OFFICE.

PAUL HALLOT, OF PARIS, FRANCE.

AUTOMATIC GOVERNOR FOR THE BRAKES OF MOTOR AND RAILWAY WHEELS AND OTHER ROTARY DEVICES.

Application filed April 6, 1921. Serial No. 459,140.

*To all whom it may concern:*

Be it known that I, PAUL HALLOT, a citizen of the French Republic, and residing in Paris, France, 15 Rue du Plelo, have invented certain new and useful Improvements in and Relating to Automatic Governors for the Brakes of Motor and Railway Wheels and Other Rotary Devices (for which I have filed an application in France December 6, 1913, No. 474,518), of which the following is a complete specification.

The object of my present invention is to provide new or improved automatic centrifugal governors or regulators, intended to control the speed of any rotary device within determinate limits. Applied to the brakes of vehicles or railway-cars, said governors permit to give the braking action its maximum intensity at high speed, preventing the dangerous effects of wedging the wheels at reduced speed.

The invention is illustrated in the accompanying drawings, wherein:

Figure 1 shows a side elevation partly in section of my improved device,

Figure 2 is a cross section of the pulley forming part of the device, taken on line 2—2 of Figure 1.

Figure 3 is a side elevation of my apparatus applied to a railway-car,

Figure 4 is a cross section through the loose pulleys thereof taken on line 4—4 of Figure 3.

Referring to Figures 1 and 2, $a$ represents the operating rod of the device to be governed or braked (slide-valve of a steam-engine, brake steerage of a vehicle or railway-car and the like), said rod $a$ being moved through the agency of a lever $e$ by a cable $b$, operated by the operating member $n$ (lever, treadle, cylinder piston, diaphragm and the like). The cable $b$ is passed $n$ times around a loose pulley $f$, arranged around masses $k$, carried around by radial partitions $i$, bolts or the like, made integral with the rotary member $h$ to be controlled. The masses $k$ are pressed by centrifugal force against the loose pulley $f$, frictionally engaging the same or causing it to be rotated with them.

When the rotary member $h$ is revolving rapidly, any strain produced upon the end $c$ of the cable $b$ will be multiplied according to the number of turns of the cable on the pulley $f$, which, when rotating solid with the shaft $h$ through the action of the centrifugal masses $k$ at high speed, acts as a brake multiplying drum and therefore transmits an increased force to the rod $a$.

As soon however, as the decrease of speed produced by said strain disconnects the pulley $f$ from the shaft $h$, said pulley becomes again loose and at a reduced speed it merely acts as a guide-pulley. The force produced by the end $d$ of the cable will therefore be automatically decreased to an extent below the force produced directly upon the end $c$ of the operating cable, to which however is added an additional force, due to the frictional engagement of the centrifugal masses against the inner surface of the loose pulley.

Attached on the lever $e$ is the end of a coiled spring $p$ the other end of which is fixed to the end of a screw-threaded rod $q$ provided with a nut $r$ which is free to rotate, but the position of which is strictly maintained. A pointer solid with the screw $q$ is arranged in front of the scale $s$ thus allowing indication of the tension of the spring $p$. An abutment $t$ limits the displacement of the lever $e$ toward the right hand side of the figure 1, and such lever $e$ may be stopped by a movable pin $u$ which may be placed in any one of the series of holes $v$ thus limiting the course of the said lever $e$.

In the application of this governor to railway-cars (Figures 3 and 4), the lever $n$ is actuated by the piston of a pressure fluid cylinder 209, connected to a fluid distributor 211, branched on the main pipe 210. The apparatus keyed on one of the car axles $h$ comprises (Figure 4) a driving sleeve $g$ composed of one or two loose pulleys 201, 202 with masses $k$ separated from one another by a fixed pulley 203 integral with the sleeve $g$. An endless cable $b$ is engaged in the groove of an operating pulley 206, suspended from the car-frame by the lever $n$ actuated when the brakes are to be applied by the piston-rod 208 of the brake-cylinder 209.

The lever $e$ of the brake steerage is actuated by means of two lugs 212 and 213 carried by the endless cable and either of which, according to the direction of movement, presses against the said lever. The latter is suitably arranged to permit of the free sliding of the leads $b$ and $b'$ of the cable.

I wish it to be understood that the devices above described are given merely by way of example. The shape of said devices may be modified as desired and the devices may be combined in any desired way without departing from the scope of the invention.

What I claim is:

1. In a braking apparatus for vehicles, a casing solid with a moving part or axle of a vehicle, centrifugal masses in said casing, driving parts controlling the rotation of the said masses, a pulley arranged in the periphery of said casing and a cable passing upon the said pulley and connected on the one hand to a controlling lever and on the other hand to a brake of the vehicle.

2. In a braking apparatus for vehicles the combination with a movable part of a vehicle of a casing carried by said part, partitions provided in the casing masses arranged in the cells determined by the said partitions, a loosely mounted pulley on the casing and with which the said masses are intended to engage under a centrifugal action, a cable passing around the pulley, an operating lever connected with the cable for rendering the same solid with the said pulley when a braking action is desired, and means for operating the brake from the cable.

3. In a braking apparatus for vehicles the combination with an axle of the said vehicle of the casing carried by the said axle, partitions provided in the casing, masses arranged in the cells determined by the said partitions, a loosely mounted pulley on the casing and with which the masses are intended to engage under a centrifugal action, a cable passing round the pulley, an operating lever connected with the cable for rendering the same solid with the said pulley when a braking action is desired, and means for operating the brake from the cable.

4. In a braking apparatus for vehicles, the combination with an axle, of a casing carried by the axle, masses in the casing, a loosely mounted pulley in the casing and with which the masses are adapted to engage, a cable wound upon the pulley, an operating lever with which one end of the cable is connected, a pivoted lever with which the other end of the cable is connected, and a rod pivoted to said lever and to which a brake rod is connected.

5. In a braking apparatus for vehicles, the combination of a movable part of a vehicle, of a casing carried by said part, masses in the casing, a loosely mounted pulley in the casing and with which the masses are adapted to engage, a cable wound upon the pulley, a lever operated by the cable and to which a controlling member of the vehicle is connected, and means for exerting tension on the cable.

6. In a braking apparatus for vehicles, the combination with an axle, of a member secured to the axle and having sides and radial wings, a pulley loosely mounted between the sides of said member, masses between the wings of the member and adapted to engage the pulley, a cable wound upon the pulley, means for operating a controlling member of the vehicle from the cable, and means for exerting tension on said cable.

In testimony I have hereunto set my hand.

PAUL HALLOT.